(12) United States Patent
Hannuksela et al.

(10) Patent No.: US 9,973,749 B2
(45) Date of Patent: May 15, 2018

(54) METHOD FOR VIDEO CODING AND AN APPARATUS, A COMPUTER-PROGRAM PRODUCT, A SYSTEM, AND A MODULE FOR THE SAME

(71) Applicant: Nokia Technologies Oy, Espoo (FI)

(72) Inventors: Miska Matias Hannuksela, Tampere (FI); Srikanth Manchenahally Gopalakrishna, Tampere (FI)

(73) Assignee: Nokia Technologies Oy, Espoo (FI)

( * ) Notice: Subject to any disclaimer, the term of this patent is extended or adjusted under 35 U.S.C. 154(b) by 344 days.

(21) Appl. No.: 13/744,142

(22) Filed: Jan. 17, 2013

(65) Prior Publication Data

US 2013/0188738 A1 Jul. 25, 2013

Related U.S. Application Data

(60) Provisional application No. 61/589,052, filed on Jan. 20, 2012.

(51) Int. Cl.
| | |
|---|---|
| *H04N 7/12* | (2006.01) |
| *H04N 19/31* | (2014.01) |
| *H04N 19/46* | (2014.01) |
| *H04N 19/67* | (2014.01) |
| *H04N 19/70* | (2014.01) |
| *H04N 19/177* | (2014.01) |

(52) U.S. Cl.
CPC ....... *H04N 19/0043* (2013.01); *H04N 19/177* (2014.11); *H04N 19/31* (2014.11); *H04N 19/46* (2014.11); *H04N 19/67* (2014.11); *H04N 19/70* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 8,913,665 B2* | 12/2014 | Wahadaniah et al. ... | 375/240.16 |
| 9,113,172 B2* | 8/2015 | Hong ..................... | H04N 19/70 |
| 2007/0291841 A1 | 12/2007 | Muraki et al. | |
| 2009/0279608 A1* | 11/2009 | Jeon et al. ............... | 375/240.16 |
| 2013/0077678 A1* | 3/2013 | Chen et al. .............. | 375/240.12 |

(Continued)

FOREIGN PATENT DOCUMENTS

| | | |
|---|---|---|
| CN | 101119493 A | 2/2008 |
| CN | 101467460 A | 6/2009 |

OTHER PUBLICATIONS

Extended European Search Report for corresponding European Application No. 13738313.9 dated Aug. 19, 2015, 8 pages.

(Continued)

*Primary Examiner* — Gims Philippe
(74) *Attorney, Agent, or Firm* — Alston & Bird LLP

(57) ABSTRACT

A method includes encoding information of at least two short-term reference picture sets into a bitstream; encoding into the bitstream a structure of pictures description with an indication being indicative of which one of the at least two short-term reference picture sets to be used for decoding by a picture in question within the structure of pictures, the structure of pictures including one or more consecutive pictures in decoding order; encoding pictures according to the structure of pictures description into the bitstream.

14 Claims, 4 Drawing Sheets

(56) References Cited

U.S. PATENT DOCUMENTS

| | | | |
|---|---|---|---|
| 2013/0089134 A1* | 4/2013 | Wang | H04N 19/70 375/240.01 |
| 2013/0148722 A1* | 6/2013 | Zhang et al. | 375/240.12 |
| 2014/0079119 A1* | 3/2014 | Samuelsson et al. | 375/240.12 |

OTHER PUBLICATIONS

International Search Report and Written Opinion for corresponding International Application No. PCT/FI2013/050052, dated Jul. 5, 2013.

Boyce, J. et al., *Extensible High Layer Syntax for Scalability*, Joint Collaborative Team on Video Coding (JCT-VC) of ITU-T SG16 WP3 and ISO/IEC JTC1/SC29/WG11, 5th Meeting, (Mar. 2011) [retrieved from Internet Sep. 16, 2015] <URL: http://wftp3.itu.int/AV-ARCH/JCTVC-SITE/>, No. JCTVC-E279. 10 pages.

Boyce, J. et al., *High layer syntax to improve support for temporal scalability*, Joint Collaborative Team on Video Coding (JCT-VC) of ITU-T SG16 WP3 and ISO/IEC JTC1/SC29/WG11, 4th Meeting, (Jan. 2011) [retrieved from Internet on Jun. 25, 2013], <URL:http://phenix.int-evry.fr/jct/doc_end_user/documents/4_Daegu/wg11/JCTVC-D200-v2.zip> 1-14.

Bross, B. et al., *WD5: Working Draft 5 of High-Efficiency Video Coding*, Joint Collaborative Team on Video Coding (JCT-VC) of ITU-T SG16 WP3 and ISO/IEC JTC1/SC29/WG11, 7th Meeting, (Nov. 2011) [retrieved from Internet on Jun. 25, 2013] <URL:http://phenix.it-evry.fr/jct/doc_end_user/documents/7_Geneva/wg11/JCTVC-G1103-v9.zip> 225 pages.

Hannuksela, M. et al., *AHG21: On reference picture list construction and reference picture marking*, Joint Collaborative Team on Video Coding (JCT-VC) of ITU-T SG16 WP3 and ISO/IEC JTC1/SC29/WG11, 7th Meeting, (Nov. 2011) [retrieved from Internet Sep. 16, 2015] <URL: http://wftp3.itu.int/AV-ARCH/JCTVC-SITE/>, No. JCTVC-G643. 10 pages.

Hannuksela, M. et al., *Indication of the temporal structure of coded video sequences*, Joint Collaborative Team on Video Coding (JCT-VC) of ITU-T SG16 WP3 and ISO/IEC JTC1/SC29/WG11, 8th Meeting, (Feb. 2012) [retrieved from Internet Sep. 16, 2015] <URL: http://wftp3.itu.int/AV-ARCH/JCTVC-SITE/>, No. JCTVC-H0423. 9 pages.

Sjöberg, R. et al., *Absolute signaling of reference pictures*, Joint Collaborative Team on Video Coding (JCT-VC) of ITU-T SG16 WP3 and ISO/IEC JTC1/SC29/WG11, 6th Meeting, (2011) [retrieved from Internet on Jun. 25, 2013] <URL:http://phenix.it-sudparis.eu/jct/doc_end_user/documents/6_Torino/wg.11/JCTVC-F493-v8.zip> 1-15.

Office Action for Chinese Application No. 2013800120755 dated Oct. 31, 2016.

Examination Report No. 1 for Standard Patent Application from corresponding Australian Patent Application No. 2013210955, dated Jun. 22, 2017, 3 pages.

Office Action for Chinese Patent Application No. 2013800120755 dated Dec. 22, 2017, with English summary, 6 pages.

\* cited by examiner

METHOD FOR VIDEO CODING AND AN APPARATUS, A COMPUTER-PROGRAM PRODUCT, A SYSTEM, AND A MODULE FOR THE SAME

TECHNICAL FIELD

The present application relates generally to video coding.

BACKGROUND

In many video coding systems, pictures that have been decoded earlier can be used for prediction of the image data of later pictures so that only the difference needs to be encoded. As known in the art, this prediction greatly reduces the size of the coded data. The order that pictures are coded or decoded needs not be the same as the pictures are output from the decoder. A picture order count (POC) may be coded into a bitstream and used in decoding to establish an output order of pictures as well as to adapt certain decoding processes, such as motion vector scaling and weights for weighted prediction. Furthermore, reference pictures may be identified through their POC value for example in reference picture set syntax structure, which identifies the reference pictures that may be used for the current picture or subsequent pictures as reference for inter prediction. As POC values may be used for identifying pictures for example in a reference picture set syntax structure, they should be sufficiently robustly coded into the bitstream for each picture so that accidental data losses e.g. due to packet losses during transmission or intentional removal of pictures, such as removal of a temporal scalability layer, do not affect the decoding operation of the remaining pictures. Consequently, POC values should be coded for each picture with a relatively large number of bits.

Many video coding systems include the possibility for temporal scalability. In other words, a subset of a coded video bitstream may be formed by excluding coded pictures, where the subset bitstream provides a lower picture rate than the original bitstream. Temporal scalability can be used for example for bitrate adaptation in transmission systems and so-called trick modes, e.g. fast forward play. Pictures in a temporally scalable video bitstream are typically organized in layers and the layer identifier, such as temporal_id in the H.264/AVC coding standard, is included in the bitstream. Temporal scalability can then be realized by including only certain layers into the subset bitstream. Thus, temporal scalability conventionally provides a fairly granular level of scalability.

There is, therefore, a need for solutions that improve the reference picture handling process without undermining coding efficiency, improve compression for picture order count values, and provide more flexible signaling for temporal structure and scalability of video bitstreams.

SUMMARY

Various aspects of examples of the invention are set out in the claims.

According to a first aspect of the present invention, a method comprises encoding information of at least two short-term reference picture sets into a bitstream; encoding into the bitstream a structure of pictures description with an indication being indicative of which one of the at least two short-term reference picture sets to be used for decoding by a picture in question within the structure of pictures, the structure of pictures comprising one or more consecutive pictures in decoding order; encoding pictures according to the structure of pictures description into the bitstream.

According to a second aspect of the present invention, an apparatus comprises at least one processor; and at least one memory including computer program code the at least one memory and the computer program code configured to, with the at least one processor, cause the apparatus to perform at least the following: encode information of at least two short-term reference picture sets into a bitstream; encode into the bitstream a structure of pictures description with an indication being indicative of which one of the at least two short-term reference picture sets to be used for decoding by a picture in question within the structure of pictures, the structure of pictures comprising one or more consecutive pictures in decoding order; encode pictures according to the structure of pictures description into the bitstream.

According to a third aspect of the present invention an apparatus comprises at least one processor; and at least one memory including computer program code, the at least one memory and the computer program code configured to, with the at least one processor, cause the apparatus to perform at least the following: decode information of at least two short-term reference picture sets from a bitstream; decode from the bitstream a structure of pictures description with an indication being indicative of which one of the at least two short-term reference picture sets to be used for decoding by a picture in question within the structure of pictures, the structure of pictures comprising one or more consecutive pictures in decoding order; decode pictures according to the structure of pictures description from the bitstream.

According to fourth aspect of the present invention, a computer-readable medium is encoded with instructions that, when executed by a computer, perform: encoding information of at least two short-term reference picture sets into a bitstream; encoding into the bitstream a structure of pictures description with an indication being indicative of which one of the at least two short-term reference picture sets to be used for decoding by a picture in question within the structure of pictures, the structure of pictures comprising one or more consecutive pictures in decoding order; encoding pictures according to the structure of pictures description into the bitstream.

According to fifth aspect of the present invention, a module for video coding comprises means for carrying out encoding sequence level information into a bitstream; encoding information of at least two short-term reference picture sets into a bitstream; encoding into the bitstream a structure of pictures description with an indication being indicative of which one of the at least two short-term reference picture sets to be used for decoding by a picture in question within the structure of pictures, the structure of pictures comprising one or more consecutive pictures in decoding order; encoding pictures according to the structure of pictures description into the bitstream.

According to sixth aspect of the present invention a method comprises decoding information of at least two short-term reference picture sets from a bitstream; decoding from the bitstream a structure of pictures description with an indication being indicative of which one of the at least two short-term reference picture sets to be used for decoding by a picture in question within the structure of pictures, the structure of pictures comprising one or more consecutive pictures in decoding order; decoding pictures according to the structure of pictures description from the bitstream.

According to seventh aspect of the present invention a computer-readable medium is encoded with instructions that, when executed by a computer, perform decoding information of at least two short-term reference picture sets from a bitstream; decoding from the bitstream a structure of pictures description with an indication being indicative of which one of the at least two short-term reference picture sets to be used for decoding by a picture in question within the structure of pictures, the structure of pictures comprising one or more consecutive pictures in decoding order; decoding pictures according to the structure of pictures description from the bitstream.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
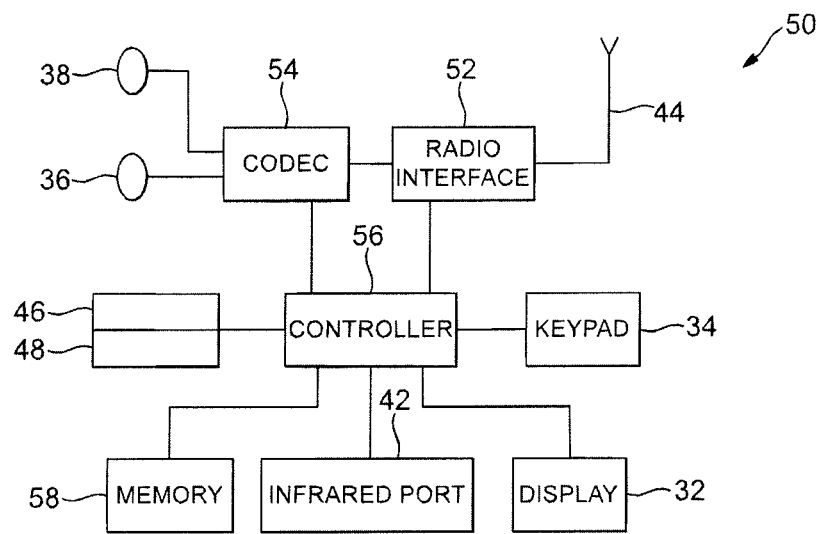
FIG. 1 shows a block diagram of a video coding system according to an example embodiment.

In the following, several embodiments of the invention will be described in the context of one video coding arrangement. It is to be noted, however, that the invention is not limited to this particular arrangement. In fact, the different embodiments have applications widely in any environment where improvement of reference picture handling is required. For example, the invention may be applicable to video coding systems like streaming systems, DVD and DB players, systems and computer programs on personal computers, handheld computers and communication devices, as well as network elements such as transcoders and cloud computing arrangements where video data is handled.

The H.264/AVC standard was developed by the Joint Video Team (JVT) of the Video Coding Experts Group (VCEG) of the Telecommunications Standardisation Sector of International Telecommunication Union (ITU-T) and the Moving Picture Experts Group (MPEG) of International Standardisation Organisation (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

There is a currently ongoing standardization project of High Efficiency Video Coding (HEVC) by the Joint Collaborative Team-Video Coding (JCT-VC) of VCEG and MPEG.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in the current working draft of HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. In H.264/AVC, a picture may either be a frame or a field. In the current working draft of HEVC, a picture is a frame. A frame comprises a matrix of luma samples and corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

In a draft HEVC standard, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. The PU splitting can be realized by splitting the CU into four equal size square PUs or splitting the CU into two rectangle PUs vertically or horizontally in a symmetric or asymmetric way. The division of the image into CUs, and division of CUs into PUs and TUs is typically signalled in the bitstream allowing the decoder to reproduce the intended structure of these units.

In a draft HEVC standard, a picture can be partitioned in tiles, which are rectangular and contain an integer number of LCUs. In the current working draft of HEVC, the partitioning to tiles forms a regular grid, where heights and widths of tiles differ from each other by one LCU at the maximum. In a draft HEVC, a slice consists of an integer number of CUs. The CUs are scanned in the raster scan order of LCUs within tiles or within a picture, if tiles are not in use. Within an LCU, the CUs have a specific scan order.

In a Working Draft (WD) 5 of HEVC, some key definitions and concepts for picture partitioning are defined as follows. A partitioning is defined as the division of a set into subsets such that each element of the set is in exactly one of the subsets.

A basic coding unit in a HEVC WD5 is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two trees, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In a HEVC WD5, pictures are divided into slices and tiles. A slice may be a sequence of treeblocks but (when referring to a so-called fine granular slice) may also have its boundary within a treeblock at a location where a transform unit and prediction unit coincide. Treeblocks within a slice are coded and decoded in a raster scan order. For the primary coded picture, the division of each picture into slices is a partitioning.

In a HEVC WD5, a tile is defined as an integer number of treeblocks co-occurring in one column and one row, ordered consecutively in the raster scan within the tile. For the primary coded picture, the division of each picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprise treeblocks contained in several tiles.

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units are typically encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention is performed always regardless of whether the bytestream format is in use or not.

NAL units consist of a header and payload. In H.264/AVC and HEVC, the NAL unit header indicates the type of the NAL unit and whether a coded slice contained in the NAL unit is a part of a reference picture or a non-reference picture. H.264/AVC includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. A draft HEVC includes a 1-bit nal_ref_idc syntax element, also known as nal_ref_flag, which when equal to 0 indicates that a coded slice contained in the NAL unit is a part of a non-reference picture and when equal to 1 indicates that a coded slice contained in the NAL unit is a part of a reference picture. The header for SVC and MVC NAL units additionally contains various indications related to the scalability and multiview hierarchy. In HEVC, the NAL unit header includes the temporal_id syntax element, which specifies a temporal identifier for the NAL unit. The bitstream created by excluding all VCL NAL units having a temporal_id greater than or equal to a selected value and including all other VCL NAL units remains conforming. Consequently, a picture having temporal_id equal to TID does not use any picture having a temporal_id greater than TID as inter prediction reference. In a draft HEVC, the reference picture list initialization is limited to only reference picture marked as "used for reference" and having a temporal_id less than or equal to the temporal_id of the current picture.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU. In H.264/AVC and HEVC a coded slice NAL unit can be indicated to be a coded slice in an Instantaneous Decoding Refresh (IDR) picture or coded slice in a non-IDR picture. In HEVC, a coded slice NAL unit can be indicated to be a coded slice in a Clean Decoding Refresh (CDR) picture (which may also be referred to as a Clean Random Access picture).

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets are essential for the reconstruction of decoded pictures, whereas many of the other non-VCL NAL units are not necessary for the reconstruction of decoded sample values.

Parameters that remain unchanged through a coded video sequence are included in a sequence parameter set. In addition to the parameters that are essential to the decoding process, the sequence parameter set may optionally contain video usability information (VUI), which includes parameters that are important for buffering, picture output timing, rendering, and resource reservation. A picture parameter set contains such parameters that are likely to be unchanged in several coded pictures. In a draft HEVC, there is also a third type of parameter sets, here referred to as Adaptation Parameter Set (APS), which includes parameters that are likely to be unchanged in several coded slices.

H.264/AVC and HEVC syntax allows many instances of parameter sets, and each instance is identified with a unique identifier. In H.264/AVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

An SEI NAL unit contains one or more SEI messages, which are not required for the decoding of output pictures but assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC consists of the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC and HEVC, an access unit consists of a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next, followed by coded slices for zero or more redundant coded pictures.

A coded video sequence is defined to be a sequence of consecutive access units in decoding order from an IDR access unit, inclusive, to the next IDR access unit, exclusive, or to the end of the bitstream, whichever appears earlier.

A group of pictures (GOP) is and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CDR NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

A structure of pictures (SOP) may be defined as follows: A SOP is one of more coded pictures consecutive in decoding order, in which the first coded picture in decoding order has temporal_id equal to 0 and nal_ref_flag equal to 1.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC. The NAL unit header indicates the type of the NAL unit and whether a coded slice contained in the NAL unit is a part of a reference picture or a non-reference picture.

Many hybrid video codecs, including H.264/AVC and HEVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may be also referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

In many video codecs, including H.264/AVC and HEVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). H.264/AVC and HEVC, as many other video compression standards, divides a picture into a mesh of rectangles, for each of which a similar block in one of the reference pictures is indicated for inter prediction. The location of the prediction block is coded as motion vector that indicates the position of the prediction block compared to the block being coded.

Inter prediction process may be characterized using one or more of the following factors.

The Accuracy of Motion Vector Representation.

For example, motion vectors may be of quarter-pixel accuracy, and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion Vector Prediction.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Differential coding of motion vectors is typically disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P or slices may be uni-predicted or intra-predicted. The reference pictures for a bi-predictive picture are not limited to be the subsequent picture and the previous picture in output order, but rather any reference pictures can be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to predicting from a reference picture in reference picture list 0, and prediction in backward direction may refer to predicting from a reference picture in reference picture list 1, even though the reference pictures for prediction may have any decoding or output order relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts, while in explicit weighted prediction, prediction weights are explicitly indicated.

In many video codecs, the prediction residual after motion compensation is first transformed with a transform kernel (like DCT) and then coded. The reason for this is that often there still exists some correlation among the residual and transform can in many cases help reduce this correlation and provide more efficient coding.

In a draft HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU.

In some coding formats and codecs, a distinction is made between so-called short-term and long-term reference pictures. This distinction may affect some decoding processes such as motion vector scaling in the temporal direct mode or implicit weighted prediction. If both of used reference pictures for the temporal direct mode are short-term reference pictures, the motion vector used in the prediction may be scaled according to the POC difference between the current picture and each of the reference pictures. However, if at least one reference picture for the temporal direct mode is a long-term reference picture, default scaling of the motion vector is used, for example scaling the motion to half may be used. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, the a default prediction weight may be used, such as 0.5 in implicit weighted prediction for bi-predicted blocks.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

H.264/AVC and a draft HEVC specify the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control requires the presence of memory management control operation (MMCO) parameters in the bitstream. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC and HEVC causes all reference pictures except for the current picture to be marked as "unused for reference". An instantaneous decoding refresh (IDR) picture contains only intra-coded slices and causes a similar "reset" of reference pictures.

In a later draft HEVC, reference picture marking syntax structures and related decoding processes have been removed and a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the a reference picture set, which are referred to as namely RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to the reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set. A reference picture set may be specified in a picture parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as reference and needed for output.

In many coding modes of H.264/AVC and HEVC, the reference picture for inter prediction is indicated with an index to a reference picture list. The index is coded with variable length coding, i.e., the smaller the index is, the shorter the corresponding syntax element becomes. Two reference picture lists (reference picture list 0 and reference picture list 1) are generated for each bi-predictive (B) slice, and one reference picture list (reference picture list 0) is formed for each inter-coded (P) slice.

Typical high efficiency video codecs such as a draft HEVC codec employ an additional motion information coding/decoding mechanism, often called merging/merge mode/process/mechanism, where all the motion information of a block/PU is predicted and used without any modification/correction. The aforementioned motion information for a PU comprises 1) The information whether 'the PU is uni-predicted using only reference picture list0' or 'the PU is uni-predicted using only reference picture list1' or 'the PU is bi-predicted using both reference picture list0 and list1' 2) Motion vector value corresponding to the reference picture list0 3) Reference picture index in the reference picture list0 4) Motion vector value corresponding to the reference picture list1 5) Reference picture index in the reference picture list1. Similarly, predicting the motion information is carried out using the motion information of adjacent blocks and/or co-located blocks in temporal reference pictures. Typically, a list, often called as merge list, is constructed by including motion prediction candidates associated with available adjacent/co-located blocks and the index of selected motion prediction candidate in the list is signalled. Then the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism is also employed for individual PUs (not necessarily the whole CU as in skip mode) and in this case, prediction residual may be utilized to improve prediction quality. This type of prediction mode is typically named as inter-merge mode.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, contained in slice headers. The RPLR commands indicate the pictures that are ordered to the beginning of the respective reference picture list. This second step may also referred to as the reference picture list modification process and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

The merge list may be generated on the basis of reference picture list 0 and/or reference picture list 1 for example using the reference picture lists combination syntax structure included in the slice header syntax. There may be a reference picture lists combination syntax structure, created into the bitstream by an encoder and decoded from the bitstream by a decoder, which indicates the contents of the merge list. The syntax structure may indicate that the reference picture list 0 and the reference picture list 1 are combined to be an additional reference picture lists combination used for the prediction units being uni-directional predicted. The syntax structure may include a flag which, when equal to a certain value, indicates that the reference picture list 0 and reference picture list 1 are identical thus reference picture list 0 is used as the reference picture lists combination. The syntax structure may include a list of entries, each specifying a reference picture list (list 0 or list 1) and a reference index to the specified list, where an entry specifies a reference picture to be included in the merge list.

A syntax structure for reference picture marking may exist in a video coding system. For example, when the decoding of the picture has been completed, the decoded reference picture marking syntax structure, if present, may be used to adaptively mark pictures as "unused for reference" or "used for long-term reference". If the decoded reference picture marking syntax structure is not present and the number of pictures marked as "used for reference" can no longer increase, a sliding window reference picture marking may be used, which basically marks the earliest (in decoding order) decoded reference picture as unused for reference.

A reference picture lists syntax structure may include three parts, reference picture list 0 description for P and B slices, reference picture list 1 description for B slices, and idle reference picture list description for any slices including those reference pictures that are not included in either reference picture list 0 or 1 but are still to be kept marked as "used for reference". In other words, there may e.g. be one syntax structure (instead of more than one) that provides the information for both reference picture marking and reference picture list construction.

When the decoding of a slice starts, the reference picture lists syntax structure may be parsed. For P and B slices, the syntax structure includes a reference picture list description for list 0, which is decoded. The reference picture list description syntax structure may list pictures identified by their picture order count (POC) value in the order they appear in the reference picture list. For B slices, the reference picture lists syntax structure may include a reference picture list description for list 1, which is decoded.

A reference picture list initialization process and/or reference picture list modification process may be omitted, and the reference picture lists may be directly described in the syntax structures.

Additionally or instead, the reference picture lists syntax structure may include a reference picture list description for an idle reference picture list, which, if present, is decoded.

Pictures that are in any of the reference picture lists may be marked as "used for reference". Pictures that are in no reference picture list may be marked as "unused for reference".

In other words, a reference picture list construction and reference picture marking processes and syntax structures may be handled in a single unified process and syntax structure.

It is noted that even though the reference pictures in the idle reference picture list have a specified order determined by the reference picture list description syntax structure, there are usually not specific requirements in which order the encoder should list the idle reference pictures. In some sense, the idle reference picture list may often be considered an unordered list or a set.

Reference picture list 0 and list 1 may contain reference pictures that are indicated to be unused for reference for the current slice. For example, a reference index beyond num_ref_idx_10_active_minus1 may not be used for reference for the current slice. It may be specified that such non-referenced reference pictures in reference picture list 0 and list 1 are marked as "used for reference". Alternatively, it may be specified that if a reference picture is only included as non-referenced reference picture in list 0 or list 1 and not in the idle reference picture list or as referenced reference picture in list 0 or list 1 it is marked as "unused for reference". Alternatively, the desired marking rule between the two above-mentioned ones or any other deterministic marking rule may be controlled by the encoder and indicated in the bitstream for example in the sequence parameter set SPS syntax. Including a reference picture as a non-reference reference picture in list 0 or list 1 may be preferred over including it in the idle reference picture list for example if fewer bits are consumed in encoding.

A reference picture list description syntax structure or a reference picture set syntax structure may be optimized in terms of overhead e.g. when the current picture has a different picture order count most significant bits (POC MSB) value than many or most of the reference pictures. This may be achieved e.g. by using delta or differential signaling, so that the reference pictures are identified with respect to a base picture order count (POC) value and only the difference needs to be transmitted. This arrangement may allow placing the reference picture list description or reference picture set syntax structure flexibly e.g. in a picture parameter set (PPS), too.

The reference picture list description syntax structure or the reference picture set syntax structure may use differential coding of picture order count values (POCs) for compression efficiency as well as for enabling the inclusion of the structure in a picture parameter set PPS. Furthermore, POC differences may be coded at a specified granularity, and the granularity at each temporal identification temporal_id may be provided in a sequence parameter set SPS. Specifying the granularity or constant interval of POC values for consequent pictures at a certain temporal_id value may be possible when a constant GOP structure is used and may improve compression efficiency. Furthermore, it may be controlled with a flag or similar if all the POC differences in a single reference picture list description syntax structure or a subset of a reference picture set syntax structure have the same sign. For example, it may be specified that the POC differences for reference picture list 0 are negative compared to the current POC, i.e. that the POC values of the reference pictures in reference picture list 0 are smaller than the POC value of the current picture. Finally, the differential POC may be coded in two parts, where the first part is fixed-length coded and the second part is variable-length coded, in order to achieve compression improvement. The fixed-length coded part may be coded as an unsigned integer and the length or the number of bits of the fixed-length coded part may be controlled by a parameter in a sequence parameter set SPS. For example, the length of the fixed-length part may be controlled by poc_granularity_minus1 syntax element in the sequence parameter set SPS. The length or the number of bits of the fixed-length coded part also determines the POC difference for one POC cycle. The variable-length coded part may indicate the number of POC cycles between the POC of the current picture and the POC of a picture in the described reference picture list. In other words, "long-term" pictures may be addressed by adding/subtracting a variable-length coded POC cycle from the POC value obtained by the differential "short-term" fixed-length POC difference. The variable-length part may be optionally present, and if the variable-length part is not present for a picture, then the POC cycle of that picture is the same as the POC cycle for the current picture.

The encoder may control the assignment of pictures as long-term reference pictures (or pictures marked as "used for long-term reference") through selection of POC values for pictures and selection of the size of the POC cycle. Reference pictures that are included in reference picture list 0 or list 1 and are in the same POC cycle as the current picture may be determined to be short-term reference pictures (or pictures marked as "used for short-term reference"), whereas the remaining pictures in list 0 and list 1 (which are in a different POC cycle as the current picture) are determined to be long-term reference pictures (or pictures marked as "used for long-term reference). The same marking is performed in the encoder and, based on the reference picture list descriptions included in the bitstream, also in the decoder. The marking as "used for long-term reference" may be used to control for example the motion vector scaling in temporal motion vector prediction for example in a temporal direct mode or the prediction weights in an implicit weighted prediction mode similarly to what is done in H.264/AVC. In some embodiments, a specific indication, such as a flag, for marking pictures as long-term reference pictures may be included in the reference picture list description syntax element, for example.

The described reference picture list 0 may include also reference pictures that are not referenced in the inter prediction process for P slices or for the forward direction of B slices. Such non-referenced reference pictures may be excluded from the final reference picture list 0 for example using the num_ref_idx_10_default_active_minus1 syntax element to limit the number of reference pictures in list 0. However, these reference pictures are included in list 0 in order to be able to describe reference picture list 1 by listing reference indexes to list 0 only. In other words, rather than listing POC values or POC differences for reference pictures in list 1, reference picture list 1 is described by listing the reference indexes or reference index differences compared to a prediction value, where the reference indexes or reference index differences refer to list 0. The prediction value may be initialized for example to 0 or to num_ref_idx_10_default_active_minus1+1 (i.e. the first index excluded from list 0). The prediction value may be updated to the resolved reference index after decoding of each reference index difference. In some embodiments, the merge list is described by indicating the POC values of the reference pictures included in it, and reference picture list 0 and list 1 are described through reference indexes to the merge list.

The reference picture list description for reference picture list 0 may include a flag for each loop entry indicating whether the identified reference picture is included in list 0 or not. Similarly, the reference picture list description for reference picture list 1 may include a flag for each loop entry indicating whether the identified reference picture is included in list 1 or not. Reference pictures that are identified in one of the reference picture list description structure for reference picture list 0 or 1 but that are not included in either list 0 or 1 may be inferred to belong to the idle reference picture list.

Figure 2:
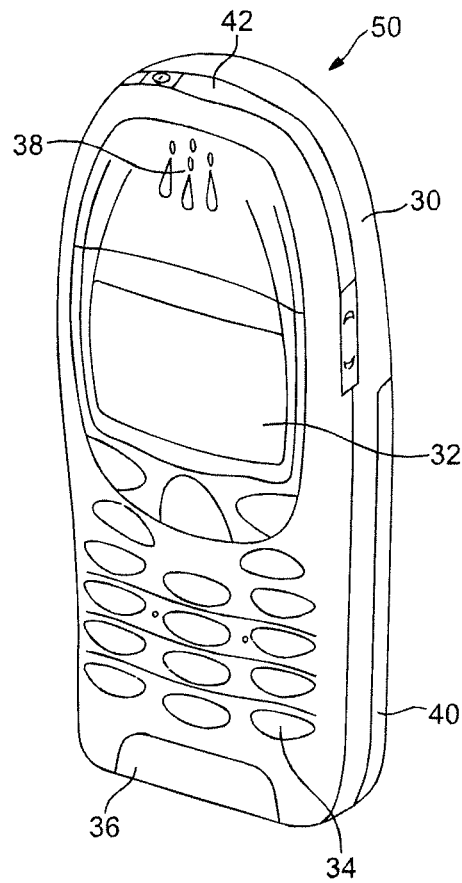
FIG. 2 shows an apparatus for video coding according to an example embodiment.

FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
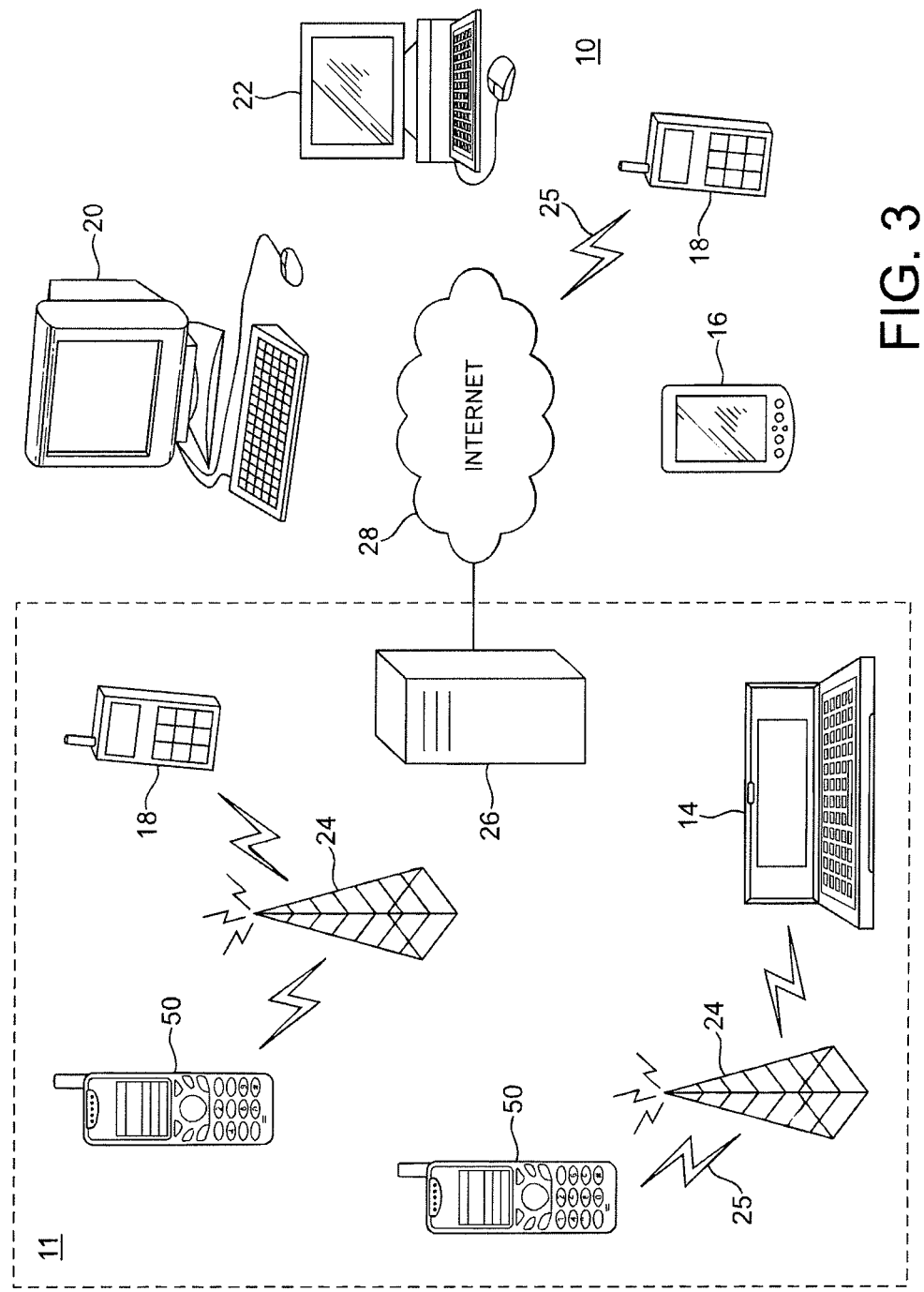
FIG. 3 shows an arrangement for video coding comprising a plurality of apparatuses, networks and network elements according to an example embodiment.

FIG. 3 shows an arrangement for video coding comprising a plurality of apparatuses, networks and network elements according to an example embodiment. With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media includ- FIGS. 4a and 4b show block diagrams for video encoding and decoding according to an example embodiment.

Figure 4A:
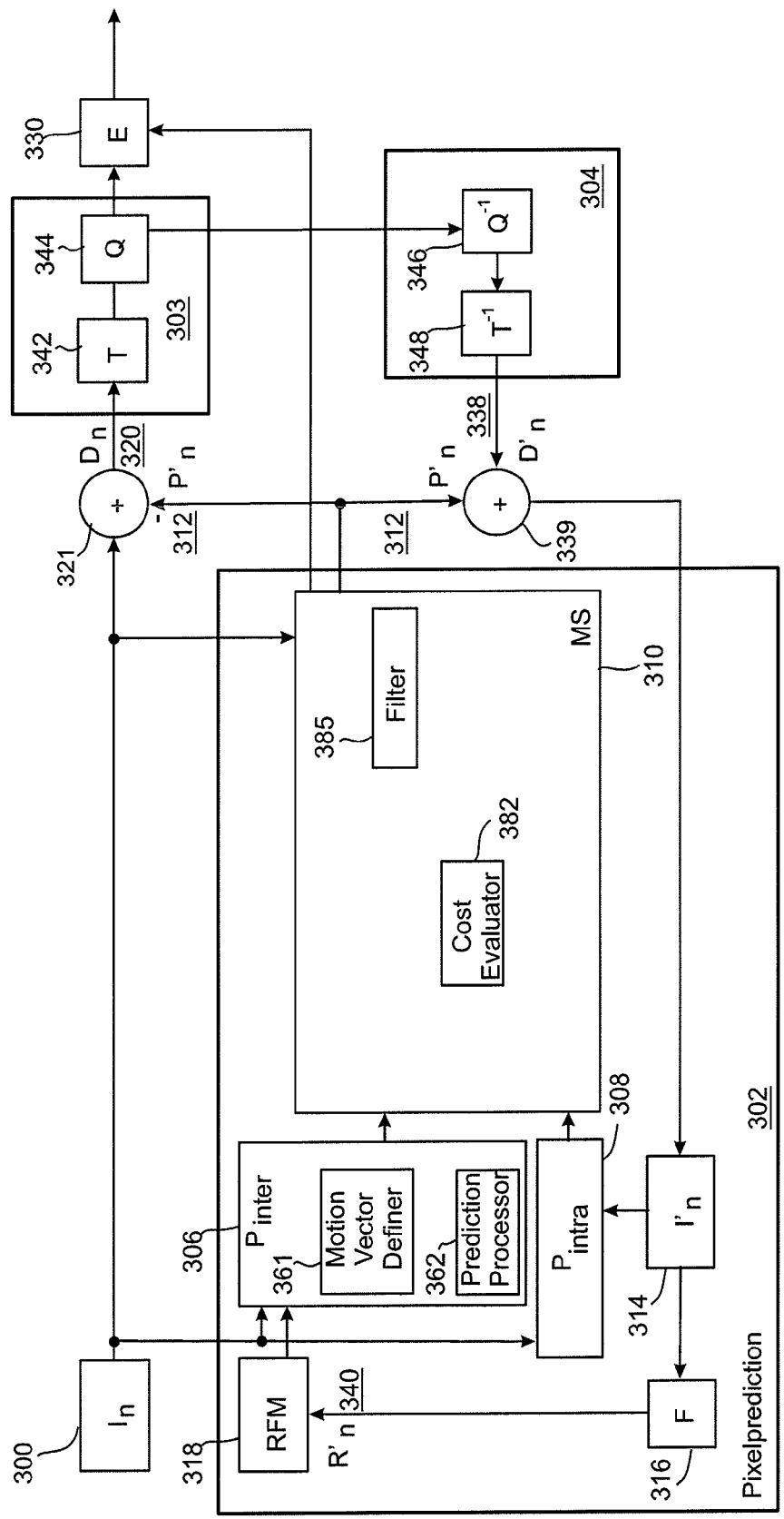
FIGS. 4a, 4b show block diagrams for video encoding and decoding according to an example embodiment.

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. In this embodiment the mode selector 310 comprises a block processor 381 and a cost evaluator 382. The encoder may further comprise an entropy encoder 330 for entropy encoding the bit stream.

Figure 4B:
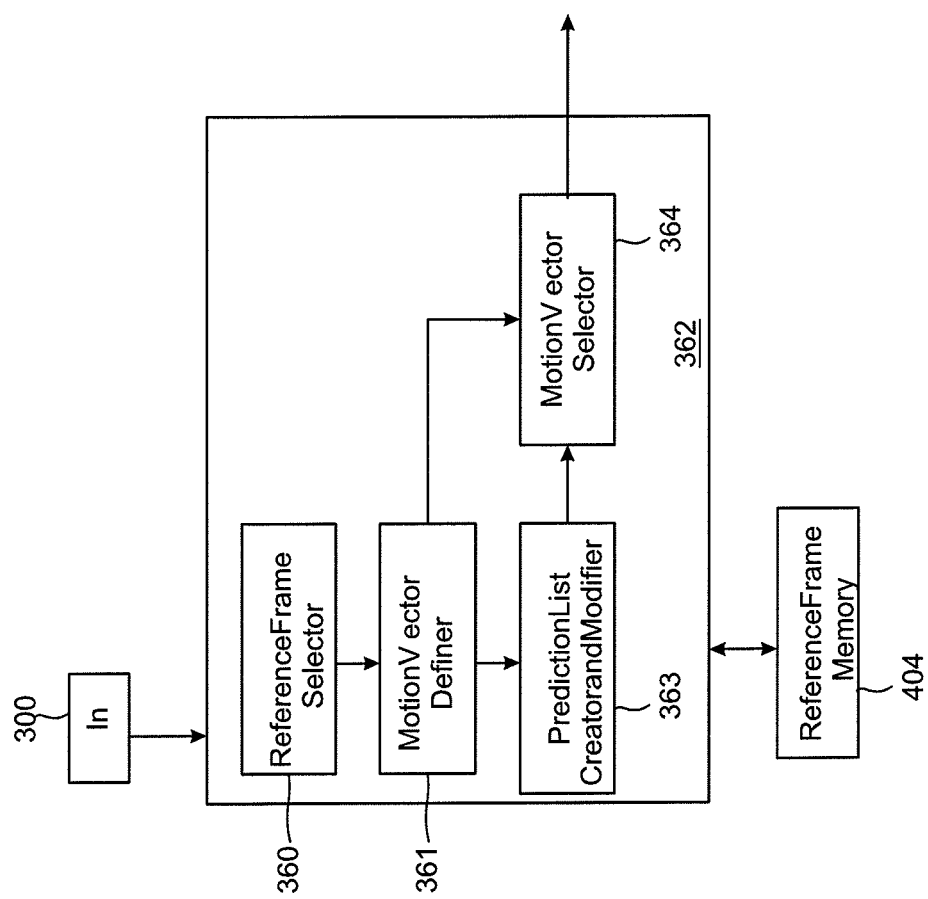

FIG. 4b depicts an embodiment of the inter predictor 306. The inter predictor 306 comprises a reference frame selector 360 for selecting reference frame or frames, a motion vector definer 361, a prediction list former 363 and a motion vector selector 364. These elements or some of them may be part of a prediction processor 362 or they may be implemented by using other means.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. Both the inter-predictor 306 and the intra-predictor 308 may have more than one intra-prediction modes. Hence, the inter-prediction and the intra-prediction may be performed for each mode and the predicted signal may be provided to the mode selector 310. The mode selector 310 also receives a copy of the image 300.

The mode selector 310 determines which encoding mode to use to encode the current block. If the mode selector 310 decides to use an inter-prediction mode it will pass the output of the inter-predictor 306 to the output of the mode selector 310. If the mode selector 310 decides to use an intra-prediction mode it will pass the output of one of the intra-predictor modes to the output of the mode selector 310.

The mode selector 310 may use, in the cost evaluator block 382, for example Lagrangian cost functions to choose between coding modes and their parameter values, such as motion vectors, reference indexes, and intra prediction direction, typically on block basis. This kind of cost function uses a weighting factor lambda to tie together the (exact or estimated) image distortion due to lossy coding methods and the (exact or estimated) amount of information that is required to represent the pixel values in an image area: C=D+lambda×R, where C is the Lagrangian cost to be minimized, D is the image distortion (e.g. Mean Squared Error) with the mode and their parameters, and R the number of bits needed to represent the required data to reconstruct the image block in the decoder (e.g. including the amount of data to represent the candidate motion vectors).

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations. In many embodiments the reference frame memory 318 may be capable of storing more than one decoded picture, and one or more of them may be used by the inter-predictor 306 as reference pictures against which the future image 300 are compared in inter prediction operations. The reference frame memory 318 may in some cases be also referred to as the Decoded Picture Buffer The operation of the pixel predictor 302 may be configured to carry out any known pixel prediction algorithm known in the art.

The pixel predictor 302 may also comprise a filter 385 to filter the predicted values before outputting them from the pixel predictor 302.

The operation of the prediction error encoder 302 and prediction error decoder 304 will be described hereafter in further detail. In the following examples the encoder generates images in terms of 16×16 pixel macroblocks which go to form the full image or picture. However, it is noted that FIG. 4a is not limited to block size 16×16, but any block size and shape can be used generally, and likewise FIG. 4a is not limited to partitioning of a picture to macroblocks but any other picture partitioning to blocks, such as coding units, may be used. Thus, for the following examples the pixel predictor 302 outputs a series of predicted macroblocks of size 16×16 pixels and the first summing device 321 outputs a series of 16×16 pixel residual data macroblocks which may represent the difference between a first macroblock in the image 300 against a predicted macroblock (output of pixel predictor 302).

The prediction error encoder 303 comprises a transform block 342 and a quantizer 344. The transform block 342 transforms the first prediction error signal 320 to a transform domain. The transform is, for example, the DCT transform or its variant. The quantizer 344 quantizes the transform domain signal, e.g. the DCT coefficients, to form quantized coefficients.

The prediction error decoder 304 receives the output from the prediction error encoder 303 and produces a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal approximately and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter parameters.

In the following the operation of an example embodiment of the inter predictor 306 will be described in more detail. The inter predictor 306 receives the current block for inter prediction. It is assumed that for the current block there already exists one or more neighboring blocks which have been encoded and motion vectors have been defined for them. For example, the block on the left side and/or the block above the current block may be such blocks. Spatial motion vector predictions for the current block can be formed e.g. by using the motion vectors of the encoded neighboring blocks and/or of non-neighbor blocks in the same slice or frame, using linear or non-linear functions of spatial motion vector predictions, using a combination of various spatial motion vector predictors with linear or non-linear operations, or by any other appropriate means that do not make use of temporal reference information. It may also be possible to obtain motion vector predictors by combining both spatial and temporal prediction information of one or more encoded blocks. These kinds of motion vector predictors may also be called as spatio-temporal motion vector predictors.

Reference frames used in encoding may be stored to the reference frame memory. Each reference frame may be included in one or more of the reference picture lists, within a reference picture list, each entry has a reference index which identifies the reference frame. When a reference frame is no longer used as a reference frame it may be removed from the reference frame memory or marked as "unused for reference" or a non-reference frame wherein the storage location of that reference frame may be occupied for a new reference frame.

In various embodiments, the structure for structures of pictures (SOP), groups of pictures (GOP), sequences of SOPs (SOSOP), sequences of GOPs (SOGOP), and coded video sequences may be encoded into a bitstream and may be used in decoding or other processes.

Each picture in a SOP description or a GOP description may be characterized by a set of syntax elements or structures, including but not limited to for example the following:
   nal_ref_flag or nal_ref_idc of the picture or any other similar syntax element indicating if a picture is a reference picture or a non-reference picture,
   temporal_id or other temporal layer identifier of the picture,
   any other scalability identifier of the picture such as spatial or SNR layer number, e.g. dependendency_id and quality_id of H.264/AVC, view identifier of a multiview sequence,
   an identifier identifying a type of the coded picture for example being a texture picture, a depth picture, a redundant texture picture, an auxiliary picture or some other type of a picture,
   an identifier identifying the coding mode used for the coded picture, for example being indicative of a intra-coded picture, inter-coded picture with uni-prediction, and inter-coded picture with bi-prediction,
   picture order count information, such as picture order count difference relative to a certain other picture, or least significant bits of the POC value for the picture,
   reference picture set for the picture,
   reference picture list modification for the picture,
   reference picture list modification for the picture,
   decoded reference picture marking for the picture,
   any other syntax elements or information that remains unchanged for the picture.

Syntax structures, such as the used reference picture set, for the picture may be either included in the SOP description or the GOP description, or an index or other identifier of the syntax structure may be included in the SOP description or the GOP description.

Pictures in a SOP description or a GOP description may be listed in their decoding or bitstream order.

SOP descriptions may be collected into a sequence-of-SOPs (SOSOP), also referred to as SOP sequences, which may have their own dedicated syntax structure. A single SOP may be included multiple times in a SOSOP and many different SOPs may be included in a SOSOP. A SOSOP may also include other SOSOPs.

In some embodiments, a GOP description may be given as a syntax structure that includes one or more of the following: a specified list of SOPs, a specified list of SOSOPs, a specified sequence of pictures. SOPs and SOSOPs may be identified in a GOP description using an identifier or may be included in a GOP description. A list of SOPs or SOSOPs may contain a number of list items, where each list item may contain a repetition count for the SOP or SOSOP and may also identify or include the SOP or SOSOP corresponding to the list item.

GOP descriptions may be collected into a sequence-of-GOPs (SOGOP), also referred to as GOP sequences, which may have their own dedicated syntax structure. A single GOP may be included multiple times in a SOGOP and many different GOPs may be included in a SOGOP. A SOGOP may also include other SOGOPs.

SOP descriptions, SOSOP descriptions, GOP descriptions, or SOGOP descriptions may be included by reference in a coded video sequence description. A coded video sequence description may include a number of entries, each of which may specify that a certain SOP, SOSOP, GOP or SOGOP description to be repeated a specified number of times.

A coded video sequence description may be inferred to start with an IDR picture that needs not be included in any SOP, SOSOP, GOP or SOGOP description.

SOP, SOSOP, GOP, SOGOP, and coded video sequence descriptions may be included for example in a sequence parameter set syntax structure, sequence header, supplemental enhancement information (SEI) message, or alike. Different descriptions need not be included in the same syntax structure. For example, SOP descriptions may be provided in the sequence parameter set, while a coded video sequence description may be provided in a SEI message.

A slice header may include an index identifying the SOP and/or GOP where the current picture belongs to and an order number identifying the picture within the SOP and/or GOP. The order number may use a definite or signaled numbering scheme. For example, the pictures within the SOP may be indexed starting from 0 and the index may be incremented by 1 for each picture in decoding order. In another example, an order number is qualified by the temporal_id and/or nal_ref_flag values so that the order number may start from 0 and be incremented by 1 among those pictures in the SOP and/or GOP that share the same values of temporal_id and/or nal_ref_flag.

In example embodiments, syntax structures, semantics of syntax elements, and decoding process may be specified as follows. Syntax elements in the bitstream are represented in bold type. Each syntax element is described by its name (all lower case letters with underscore characters), its one or two syntax categories, and one or two descriptors for its method of coded representation. The decoding process behaves according to the value of the syntax element and to the values of previously decoded syntax elements. When a value of a syntax element is used in the syntax tables or the text, it appears in regular (i.e. not bold) type. In some cases the syntax tables may use the values of other variables derived from syntax elements values. Such variables appear in the syntax tables, or text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the subclause in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

In example embodiments, common notation for arithmetic operators, logical operators, relational operators, bit-wise operators, assignment operators, and range notation e.g. as specified in H.264/AVC or a draft HEVC may be used. Furthermore, common mathematical functions e.g. as specified in H.264/AVC or a draft HEVC may be used and a common order of precedence and execution order (from left to right or from right to left) of operators e.g. as specified in H.264/AVC or a draft HEVC may be used.

In example embodiments, the following descriptors may be used to specify the parsing process of each syntax element.

se(v): signed integer Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with most significant bit written first.

ue(v): unsigned integer Exp-Golomb-coded syntax element with the left bit first.

An Exp-Golomb bit string may be converted to a code number (codeNum) for example using the following table:

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

A code number corresponding to an Exp-Golomb bit string may be converted to se(v) for example using the following table:

| codeNum | syntax element value |
|---|---|
| 0 | 0 |
| 1 | 1 |
| 2 | −1 |
| 3 | 2 |
| 4 | −2 |
| 5 | 3 |
| 6 | −3 |
| ... | ... |

In example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

In an example embodiment, the following section of syntax may be added to the sequence parameter set.

```
num_short_term_ref_pic_sets                                    ue(v)
for(idx = 0; idx < num_short_term_ref_pic_sets; idx++)
    short_term_ref_pic_set( idx )
if( num_short_term_ref_pic_sets ) {
    sequence_description_flag                                  u(1)
    if( sequence_description_flag ) {
        num_sops_minus1                                        ue(v)
        for( sopIdx = 0; sopIdx <= num_sops_minus1; sopIdx++ )
            sop_description( sopIdx )
        num_sop_sequences_minus1                               ue(v)
        for( i = 0; i <= num_sop_sequences_minus1; i++ ) {
            sop_repetition_cnt_idc[ i ]                        ue(v)
            sop_idx[ i ]                                       ue(v)
        }
    }
}
``` num_short_term_ref_pic_sets specifies the number of short-term reference picture sets that are specified in the picture parameter set. The value of num_short_term_ref_pic_sets shall be in the range of 0 to 64, inclusive.

sequence_description_flag equal to 0 specifies that the coded video sequence is not described in the sequence parameter set. sequence_description_flag equal to 1 specifies that the coded video sequence is described in the sequence parameter set.

num_sops_minus1+1 specifies the number of SOPs described with the sop_description( ) syntax structure.

num_sop_sequences_minus1+1 specifies the number of SOP sequences described for the coded video sequence.

sop_repetition_cnt_idc[i] specifies the variable SopRepetitionCnt[i] as follows.

```
if( i = = num_sop_sequences_minus1 )
    SopRepetitionCnt[ i ] = sop_repetition_cnt_idc[ i ]
else
    SopRepetitionCnt[ i ] = sop_repetition_cnt_idc[ i ] + 1
```

Variable SopRepetitionCnt[i] specifies the number of times the SOP with index sop_idx[i] is repeated in this SOP sequence. If SopRepetitionCnt[i] is 0, this SOP sequence is the last SOP sequence in the coded video sequence and the SOP with index sop_idx[i] may be repeated any number of times in this SOP sequence.

sop_idx[i] specifies the SOP index included in SOP sequence of index i.

A SOP description syntax structure may be specified as follows:

| sop_description( sopIdx ) { | Descriptor |
|---|---|
|   num_pics_in_sop_minus1[ sopIdx ] | ue(v) |
|   for( i = 0; i <= num_pics_in_sop_minus1; i++ ) { | |
|     nal_ref_flag[ sopIdx ][ i ] | u(1) |
|     temporal_id[ sopIdx ][ i ] | u(3) |
|     single_slice_type_flag[ sopIdx ][ i ] | u(1) |
|     if( single_slice_type_flag[ sopIdx ][ i ] ) | |
|       slice_type[ sopIdx ][ i ] | ue(v) |
|     poc_delta[ sopIdx ][ i ] | se(v) |
|     st_rps_idx[ sopIdx ][ i ] | ue(v) |
|   } | |
| } | |

This syntax structure has an input parameter gopIdx indicating the GOP index for the GOP described in the syntax structure.

This syntax structure has an input parameter sopIdx indicating the SOP index for the SOP described in the syntax structure.

num_pics_in_sop_minus1[sopIdx]+1 specifies the number of pictures in the SOP.

nal_ref_flag[sopIdx][i] specifies the nal_ref_flag value of the i-th picture in decoding order within the SOP.

temporal_id[sopIdx][i] specifies the temporal_id value of the i-th picture in decoding order within the SOP.

poc_delta[sopIdx][i], when i is greater than 0, specifies the value of DiffPicOrderCnt (the i-th picture in decoding order within the SOP, the (i−1)th picture in decoding order within the SOP). poc_delta[sopIdx][i], when i is equal to 0 and this SOP is not the first SOP of the coded video sequence, specifies the value of DiffPicOrderCnt (the i-th picture in decoding order within the SOP, the last picture in decoding in the previous SOP in the coded video sequence). poc_delta[sopIdx][i], when i is equal to 0 and this SOP is the first SOP of the coded video sequence, specifies the value of DiffPicOrderCnt (the i-th picture in decoding order within the SOP, 0).

st_rps_idx[sopIdx][i] specifies the short-term reference picture set used by the i-th picture in decoding order within the SOP.

Variables PocInSOP[sopIdx][picIdx][tId][nalRefFlag], SingleSliceFlag[sopIdx][picIdx][tId][nalRefFlag], LastPocInSOP[sopIdx], and MaxPicIdx[sopIdx][tId][nalRefFlag], where tId and nalRefFlag are temporal_id and nal_ref_flag values appearing in the described SOP and picIdx is a picture index among pictures in the SOP having the particular temporal_id and nal_ref_flag values, are derived as follows.

Initially, MaxPicIdx[sopIdx][tId][nalRefFlag]=0 for all values of tId and nalRefFlag.

```
pocInSOP = 0
for( i = 0; i <= num_pics_in_sop_minus1; i++ ) {
   tId = temporal_id[ sopIdx ][ i ]
   nalRefFlag = nal_ref_flag[ sopIdx ][ i ]
   pocInSOP += poc_delta[ sopIdx ][ i ]
   PocInSOP[ sopIdx ][ MaxPicIdx[ sopIdx ][ tId ][ nalRefFlag ] ][ tId ]
      [ nalRefFlag ] =
pocInSOP
   SingleSliceFlag[ sopIdx ][ MaxPicIdx[ sopIdx ][ tId ][ nalRefFlag ]
]
   [ tId ][ nalRefFlag ] =
      single_slice_flag[ sopIdx ][ i ]
   LastPocInSOP[ sopIdx ] = pocInSOP
   MaxPicIdx[ sopIdx ][ tId ][ nalRefFlag ]++
}
```

A bitstream may not contain all the pictures described in a SOP description. For example, the bitstream may have been subject to temporal_id based sub-bitstream extraction, while the sequence parameter set has not been modified to remove those pictures from SOP descriptions that have temporal_id values no longer existing in the extracted bitstream.

The slice header syntax may be modified as follows, with deletions indicated by strikethrough and additions indicated by italics:

| slice_header( ) { | Descriptor |
|---|---|
|   lightweight_slice_flag | u(1) |
|   if( !lightweight_slice_flag ) { | |
|     ~~slice_type~~ | ~~ue(v)~~ |
|     pic_parameter_set_id | ue(v) |
|     if( IdrPicFlag ) { | |
|       idr_pic_id | ue(v) |
|       no_output_of_prior_pics_flag | u(1) |
|     } | |
|     else { | |
|       if( sequence_description_flag ) { | |
|         *sop_idx* | *ue(v)* |
|         *if( MaxPicIdx[ sop_idx ][ temporal_id ][ nal_ref_flag ] > 1 )* | |
|           *pic_idx_in_sop* | *u(v)* |
|       } | |
|       *if( !sequence_description_flag || ( sequence_description_flag && !SingleSliceFlag[ sop_idx ][ pic_idx_in_sop ][ temporal_id ][ nal_ref_flag ] ) )* | |
|         slice_type | ue(v) |
|       if( !sequence_description_flag ) { | |
|         pic_order_cnt_lsb | u(v) |
|         short_term_ref_pic_set_pps_flag | u(1) |
|         if( !short_term_ref_pic_set_pps_flag ) | |

-continued

| slice_header( ) { | Descriptor |
|---|---|
|       short_term_ref_pic_set( num_short_term_ref_pic_sets ) | |
|     else | |
|       short_term_ref_pic_set_idx | u(v) |
|     if( long_term_ref_pics_present_flag ) { | |
|       num_long_term_pics | ue(v) |
|       for( i = 0; i < num_long_term_pics; i++ ) { | |
|         delta_poc_lsb_lt_minus1[ i ] | ue(v) |
|         used_by_curr_pic_lt_flag[ i ] | u(1) |
|       } | |
|     } | |
|   } | |
| } | |
| if( slice_type == P | | slice_type == B ) { | |
|   num_ref_idx_active_override_flag | u(1) |
|   if( num_ref_idx_active_override_flag ) { | |
|     num_ref_idx_l0_active_minus1 | ue(v) |
|     if( slice_type == B ) | |
|       num_ref_idx_l1_active_minus1 | ue(v) |
|   } | |
| } | |
| ... | |
| } | |

The semantics of the additional syntax elements in the slice header may be specified as follows:
sop_idx specifies the SOP index of the SOP including the current picture.
pic_idx_in_sop specifies the picture index within the SOP identified by sop_idx among pictures in that SOP having the same temporal_id and nal_ref_flag values as the current picture. The length of the pic_idx_in_sop syntax element is Ceil((Log 2(MaxPicIdx[sop_idx][temporal_id][nal_ref_flag])). If pic_idx_in_sop is not present, it is inferred to be 0.

In some embodiments SOP, SOSOP, GOP, SOGOP, and/or coded video sequence description and the related changes in the slice header may be used in combination with granular picture order count values.

In some embodiments, the granularity at each temporal identification temporal_id may be provided in a sequence parameter set for example by adding the following syntax to the sequence parameter set syntax structure:

```
for( i = 0; i <= max_temporal_layers_minus1; i++ )
    poc_granularity_minus1[ i ]                          ue(v)
if( max_temporal_layers_minus1 == 0 )
    ref_pic_poc_granularity_delta                        ue(v)
``` poc_granularity_minus1[i]+1 specifies that the POC value interval of any two consecutive pictures in output order having temporal_id equal to or smaller than i shall be j*(poc_granularity_minus1[i]+1), where j is a positive integer. (poc_granularity_minus1[i]+1) shall be equal to k*(poc_granularity_minus1[i+1]+1), where k is a positive integer and i is greater than 0.
ref_pic_poc_granularity_delta specifies that, when all pictures have temporal_id equal to 0, the POC value difference of any two consecutive reference pictures in output order shall be an integer multiple of (poc_granularity_minus1[0]+ref_pic_poc_granularity_delta+1).

The picture order count syntax structure may be appended to include the following syntax element:

| tid_for_rps_pred_offset | u(3) |
|---|---| tid_for_rps_pred_offset specifies the lowest temporal_id value from which, if non-zero, 1 is subtracted in the decoding process of reference picture set when determining the temporal_id based POC granularity to be used for the prediction value of the picture order count corresponding to deltapoc_s0[i] and delta_poc_s1[i], when i is greater than 0. tid_for_rps_pred_offset is typically the lowest temporal_id value TID such that no picture having temporal_id greater than or equal to TID uses another picture having the same temporal_id value as reference picture in any reference picture list.

Instead of pic_order_cnt_lsb syntax element, a pic_order_cnt_cycle syntax element may be used. Its length may be determined by the maximum number of bits signalled to be used for the POC least significant bits and/or the POC granularity determined by the temporal_id of the current picture.

The contents of the short-term subsets of the reference picture set with index StRpsIdx may be determined with the following process. NumNegativePics[ ] indicates the number of pictures having a smaller POC than that of the current picture. NumPositivePics[ ] indicates the number of pictures having a greater POC than that of the current picture. DeltaPocS0[ ][ ] and DeltaPocS1[ ][ ] indicate the POC value differences for the reference picture set as provided in the bitstream, and UsedByCurrPicS0 and UsedByCurrPicS1 contain flags to indicate whether or not the respective picture is to be included in initial reference picture list 0 or 1 for the current picture.

```
if( temporal_id >= tid_for_rps_pred_offset && temporal_id > 0 )
    granTID = temporal_id − 1
else
    granTID = temporal_id
for( i = 0, j = 0, k = 0; i < NumNegativePics[ StRpsIdx ] ; i++ )
{
    if( ( i > 0 || nal_ref_flag > 0 ) &&
        max_num_temporal_layers_minus1 == 0 )
        absDeltaPocPred = poc_granularity_minus1[ 0 ] +
    ref_pic_poc_granularity_delta + 1
    else if( i == 0)
        absDeltaPocPred = poc_granularity_minus1
            [ temporal_id ] + 1
    else
        absDeltaPocPred = poc_granularity_minus1[ granTID ] + 1
```

-continued

```
    if( i = = 0)
        DeltaPoc[ StRpsIdx ][ i ] = -absDeltaPocPred - DeltaPocS0
            [StRpsIdx ][ i ] *
    absDeltaPocPred
    else
        DeltaPoc[ StRpsIdx ][ i ] = DeltaPoc[ StRpsIdx ][ i - 1 ] -
        absDeltaPocPred -
            DeltaPocS0[ StRpsIdx ][ i ] * absDeltaPocPred
    if( UsedByCurrPicS0[ StRpsIdx ][ i ] )
        RefPicSetStCurr0[ j++ ] = PicOrderCnt + DeltaPoc
        [ StRpsIdx ] [i ]
    else
        RefPicSetStFoll0[ k++ ] = PicOrderCnt + DeltaPoc
        [ StRpsIdx ] [ i ]
}
NumRpsStCurr0 = j
NumRpsStFoll0 = k
for( i = 0, j = 0, k = 0, m = NumNegativePics[ StRpsIdx ];
i < NumPositivePics[ StRpsIdx ]; i++, m++ ) {
    if( ( i > 0 || nal_ref_flag > 0 ) &&
    max_num_temporal_layers_minus1 = = 0 )
        deltaPocPred = poc_granularity_minus1 [ 0 ] +
    ref_pic_poc_granularity_delta + 1
    elseif( i = = 0)
        deltaPocPred = poc_granularity_minus1[ temporal_id ] + 1
    else
        deltaPocPred = poc_granularity_minus1[ granTID ] + 1
    if( i = = 0)
    DeltaPoc[ StRpsIdx ][ m ] = absDeltaPocPred + DeltaPocS1
    StRpsIdx ][ i ] *
    [absDeltaPocPred
    else
        DeltaPoc[ StRpsIdx ][ m ] = DeltaPoc[ StRpsIdx ][ m -
        1 ] + absDeltaPocPred +
            DeltaPocS1[ StRpsIdx ][ i ] * absDeltaPocPred
    if( UsedByCurrPicS1[ StRpsIdx ][ i ] )
        RefPicSetStCurr1[ j++ ] = PicOrderCnt + DeltaPoc
        [ StRpsIdx ][ m ]
    else
        RefPicSetStFoll1[ k++ ] = PicOrderCnt + DeltaPoc
        [ StRpsIdx ][ m ]
}
NumRpsStCurr1 = j
NumRpsStFoll1 = k
```

In some embodiments, a reference picture set or a reference picture list description may be predicted from another reference picture set or reference picture list description.

In some embodiments, granular POC values are used but the granularity is not based on temporal_id but rather it is explicitly indicated for each reference picture set or reference picture list description. For example, a reference picture set syntax structure or a reference picture list description syntax structure may include a multiplication factor (pocGranularity) and an addition factor (pocOffset). In some embodiments pocGranularity and pocOffset are derived from syntax elements included for example in reference picture set syntax structure or a reference picture list description syntax structure. A reference picture set syntax structure or a reference picture list description syntax structure may include a POC difference value (pocDiffIdc), or may contain syntax elements from which pocDiffIdc can be derived, for each described picture. A POC difference relative to the POC of the current picture may then be derived as follows:

```
for( i = 0; i < NumNegativePics[ StRpsIdx ] ; i++ ) {
    if (i = = 0)
        DeltaPoc[ StRpsIdx ][ i ] = -(pocDiffIdc[ i ] * pocGranularity
+
        pocOffset)
    else
```

```
        DeltaPoc[ StRpsIdx ][ i ] = DeltaPoc[ StRpsIdx ][ i-1 ] -
            pocDiffIdc[ i ] *
        pocGranularity
}
```

The DeltaPoc values of the positive subsets S1 of the reference picture set may be derived similarly but with different signs.

A SOP, SOSOP, GOP, SOGOP, and/or coded video sequence description may be used by an entity, which uses or creates a bitstream subset. Such an entity may be for example a streaming server, a media gateway, a transrater, or a media player. A bitstream subset may be created to adjust media bitrate. In streaming, bit rate can be controlled at the streaming server or in some element of the telecommunications network, such as a media gateway or a base station of a mobile communications network. With the provided SOP, SOSOP, GOP, SOGOP, and/or coded video sequence descriptions, a streaming server or other network entity is capable of deducing dependencies between coded pictures directly from high-level structures of the bitstream, such as slice headers and sequence parameter sets. Therefore, bitrate adaptation becomes easier when SOP, SOSOP, GOP, SOGOP, and/or coded video sequence descriptions are available in the video bitstream.

The invention provides means for carrying out multimedia data traffic shaping in a streaming server or other network entity comprising decoding SOP, SOSOP, GOP, SOGOP, and/or coded video sequence descriptions and concluding dependencies between coded pictures from these descriptions. In some embodiments, the encoder and/or a bitstream analyzer provides information of the average bit rate and/or frame rate and/or other statistics related to identified SOPs, SOSOPs, GOPs, SOGOPs, coded video sequences, and/or temporal layers for example in an SEI message or some other part of the video bitstream. The streaming server or another network entity may determine the maximum value of the bandwidth available for the data transfer and/or the decoding rate of the terminal device. On the basis of this information, the streaming server or another network entity may determine how many scalability layers are transmitted and it may also or alternatively determine which pictures, SOPs, SOSOPs, GOPs, and/or SOGOPs are transmitted. Bit rate control can thus be carried out, when necessary, by making first a rough adjustment of the number of the scalability layers, after which finer adjustment can be carried out on picture, SOP, SOSOP, GOP, and/or SOGOP basis. At its simplest, bit rate control means making SOP-specific decisions on whether pictures at temporal_id greater than 0 from a particular SOP will be removed from it. Bit rate control may also be done picture-wise by analyzing from SOP or GOP descriptions which subsequent pictures use a particular picture as reference and removing all such subsequent pictures together with the particular picture in a recursive manner. Bitrate control may for example minimize a rate-distortion cost function where the distortion is the number of pictures removed and rate is the bitrate saved by removal, and either rate or distortion is weighted by a multiplicative weighting factor (lambda), and the rate-distortion cost function is then minimized to select the pictures to be removed to obtain approximately a certain bitrate reduction.

A media player, such as a multimedia file player, Digital Versatile Disk (DVD) player or similar player for optical disks, or a personal video recording (PVR) device, may use SOP, SOSOP, GOP, SOGOP, and/or coded video sequence descriptions to select which coded frames are processed in certain operations, such as trick play (e.g. play at a picture rate that is faster than real-time). A media player may decode SOP, SOSOP, GOP, SOGOP, and/or coded video sequence descriptions and slice headers to analyze which coded pictures are decoded or processed. For example, a reference picture and all pictures referring to the reference picture may be omitted from decoding based on the information, particularly the reference picture set or list information, in SOP, SOSOP, GOP, SOGOP, and/or coded video sequence descriptions.

A transrater modifies the bitrate of a video bitstream by transcoding a part of the bitstream. A transrater can choose frames to transcode so that only few other frames depend on the transcoded frame on the basis of SOP, SOSOP, GOP, SOGOP, and/or coded video sequence descriptions and hence minimize drift in the coded frames referring to the transcoded frames.

A decoding apparatus may be able to process several pictures in parallel for example when it has multiple processors or processor cores. However, when a picture is being decoded in parallel with another picture, the decoded samples or other decoding results of one of these pictures should not be used in the decoding process of the other one of these pictures, because otherwise one of the decoding processes would be halted until the other decoding process is finished. Hence, SOP, SOSOP, GOP, SOGOP, and/or coded video sequence descriptions, and particularly the reference picture set or reference picture list information included in them, may be used by a decoding apparatus capable of parallel processing to conclude which pictures can be decoded in parallel, i.e. which pictures do not refer to each other directly or indirectly for example in inter prediction process or some other prediction process.

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments.

The invention claimed is:

1. A method, comprising:
   encoding information of at least two short-term reference picture sets into a bitstream;
   encoding into the bitstream a structure of pictures description including a supplemental enhancement information message with a reference picture index that provides an indication as to which one of the at least two short-term reference picture sets is to be used for decoding by a picture in question within the structure of pictures, the structure of pictures comprising two or more consecutive pictures in decoding order and temporal identification of the two or more consecutive pictures; and
   encoding pictures according to the structure of pictures description into the bitstream to permit dependencies between encoded pictures to be deduced from the structure of pictures description.

2. The method according to claim 1, further comprising encoding the structure of pictures description into a sequence parameter set.

3. The method according to claim 1, further comprising collecting at least one structure of pictures description into a description of a sequence of structures of pictures.

4. The method according to claim 1, further comprising including a reference to a structure of pictures description into a coded video sequence description.

5. The method according to claim 3, further comprising including a reference to a description of a sequence of structures of pictures into a coded video sequence description.

6. The method according to claim 1, further comprising providing a slice header with an index identifying the structure of pictures, where a picture in question belongs to, and with an order number identifying the picture in question within said structure of pictures.

7. An apparatus, comprising:
   at least one processor; and
   at least one memory including computer program code,
   the at least one memory and the computer program code configured to, with the at least one processor, cause the apparatus to perform at least the following:
   encode information of at least two short-term reference picture sets into a bitstream,
   encode into the bitstream a structure of pictures description including a supplemental enhancement information message with a reference picture index that provides an indication as to which one of the at least two short-term reference picture sets is to be used for decoding by a picture in question within the structure of pictures, the structure of pictures comprising two or more consecutive pictures in decoding order and temporal identification of the two or more consecutive pictures; and
   encode pictures according to the structure of pictures description into the bitstream to permit dependencies between encoded pictures to be deduced from the structure of pictures description.

8. The apparatus of claim 7, wherein the processor comprises at least one memory that contains computer program code that if executed by the processor cause the apparatus to encode the structure of pictures description into a sequence parameter set.

9. The apparatus of claim 7, wherein the processor comprises at least one memory that contains computer program code that if executed by the processor cause the apparatus to collect at least one structure of pictures description into a description of a sequence of structures of pictures.

10. The apparatus of claim 7, wherein the processor comprises at least one memory that contains computer program code that if executed by the processor cause the apparatus to include a reference to a structure of pictures description into a coded video sequence description.

11. The apparatus of claim 9, wherein the processor comprises at least one memory that contains computer program code that if executed by the processor cause the apparatus to include a reference to a description of a sequence of structures of pictures into a coded video sequence description.

12. The apparatus of claim 7, wherein the processor comprises at least one memory that contains computer program code that if executed by the processor cause the apparatus to provide a slice header with an index identifying the structure of pictures, where a picture in question belongs to, and with an order number identifying the picture in question within said structure of pictures.

13. An apparatus, comprising at least one processor; and at least one memory including computer program code, the at least one memory and the computer program code configured to, with the at least one processor, cause the apparatus to perform at least the following:
  decode information of at least two short-term reference picture sets from a bitstream;
  decode from the bitstream a structure of pictures description including a supplemental enhancement information message with a reference picture index that provides an indication as to which one of the at least two short-term reference picture sets is to be used for decoding by a picture in question within the structure of pictures, the structure of pictures comprising two or more consecutive pictures in decoding order and temporal identification of the two or more consecutive pictures; and
  decode pictures according to the structure of pictures description from the bitstream, wherein decoding pictures according to the structure of pictures description comprises permitting dependencies between encoded pictures to be deduced from the structure of pictures description.

14. A method, comprising
  decoding information of at least two short-term reference picture sets from a bitstream;
  decoding from the bitstream a structure of pictures description including a supplemental enhancement information message with a reference picture index that provides an indication as to which one of the at least two short-term reference picture sets is to be used for decoding by a picture in question within the structure of pictures, the structure of pictures comprising two or more consecutive pictures in decoding order and temporal identification of the two or more consecutive pictures; and
  decoding pictures according to the structure of pictures description from the bitstream, wherein decoding pictures according to the structure of pictures description comprises permitting dependencies between encoded pictures to be deduced from the structure of pictures description.

* * * * *